United States Patent
Rutgers (10) Patent No.: US 6,241,609 B1
(45) Date of Patent: Jun. 5, 2001

(54) VIRTUAL ENVIRONMENT VIEWPOINT CONTROL

(75) Inventor: Job Rutgers, Utrecht (NL)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/228,220

(22) Filed: Jan. 11, 1999

(30) Foreign Application Priority Data

Jan. 9, 1998 (GB) .................................................. 9800397

(51) Int. Cl.[7] .................................................. A63F 13/00
(52) U.S. Cl. .............................. 463/31; 463/32; 345/419
(58) Field of Search ................................ 463/30, 31, 32; 273/148 B; 345/112

(56) References Cited

U.S. PATENT DOCUMENTS

| | | | |
|---|---|---|---|
| 5,347,306 | * 9/1994 | Nitta | 348/15 |
| 5,491,743 | * 2/1996 | Shiio et al. | 379/202 |
| 5,736,982 | * 4/1998 | Suzuki et al. | 345/330 |
| 5,913,727 | * 6/1999 | Ahdoot | 463/39 |
| 6,139,434 | * 10/2000 | Miyamoto et al. | 463/32 |

FOREIGN PATENT DOCUMENTS

0697613A2    2/1996   (EP) .

* cited by examiner

Primary Examiner—Joe H. Cheng
Assistant Examiner—Kathleen M. Christman
(74) Attorney, Agent, or Firm—Gregory L. Thorne (57) ABSTRACT

A multi-user interactive virtual environment system wherein each user is provided with data to generate a respective image of the virtual environment and characters therein, including an assigned character particular to that individual user, from a respective virtual camera viewpoint determined at least partially by the user-directed motion of their assigned character. Each character has an interaction zone of predetermined size and shape maintained about its current virtual environment location. When the respective interaction zones of two or more user-assigned characters overlap, their respective virtual cameras are controlled to move from first- to third-person viewpoints for as long as the overlap remains. In a refinement, at least one further interaction zone at a given location within the virtual environment, and independent of any particular character within the virtual environment, takes control of all character virtual cameras as those characters enter the zone.

20 Claims, 10 Drawing Sheets

VIRTUAL ENVIRONMENT VIEWPOINT CONTROL

BACKGROUND OF THE INVENTION

The present invention relates to interactive environment systems such as immersive games and virtual reality or shared (multi-user) virtual environment systems which provide the user or users with a view of a virtual world within which the users computer-generated virtual presence appears and may interact with other such user virtual presences as well as, optionally, features of the environment itself. In particular, the present invention relates to such systems having means for controllably varying the viewpoint from which the image of the environment (as presented to a user) is rendered, a feature referred to herein as "virtual camera" control.

A description of a system providing a virtual environment (or cyberspace) accessible by remote users is given in European patent application EP-A-0 697 613 (Sony Corp.). The system described includes a server providing a virtual reality space, and user terminals connected to the server via a high-speed communications network (using optical fibres or the like). In operation, the server maintains a number of virtual environments and supports many differing terminal types by the use of conversion objects between information objects and user objects: the conversion objects provide individually tailored translation for communications back and forth between each type of terminal and each configuration of virtual environment supported.

At each user terminal, the user is presented with a two-dimensional view of the three-dimensional virtual environment from their own particular viewpoint location within the three-dimensional environment, with computer-generated representations of any other users who may at that time be within the same area of the virtual environment as the viewing user. Rather than generating a representation of a whole or part of the viewing user in the image seen by that user, the system of EP-A-0 697 613 takes the first-person view (i.e. the image is that which would be seen through the "eyes" of the users computer generated character) but provides a simple arrow-shaped cursor which the user may utilise to indicate or select items from within the virtual environment by up/down/left/right movements of the cursor in the presented two-dimensional image of the environment or, by clicking on the virtual character of a further user, to initiate a conversation or other interaction between two users. This technique is used in EP-A-0 697 613 as an improvement to a described prior art system in which the user is represented by a rendered character always appearing in the centre of the image presented to the user, such that the user takes a third-person view of their representation within the virtual environment.

Although rendering from the first-person point of view enhances a users feeling of immersion within the virtual environment, it can prove less than satisfactory when it comes to interacting with the virtual representations of other users where the third-person point of view provides the user with more information in the way of context for the interaction. Being able to select the viewpoint (virtual camera position) relative to your own representation would be an asset but the requirement to do so could become a distraction over time.

SUMMARY OF THE INVENTION

It is accordingly an object of the present invention to provide a system configured to automatically adjust the virtual camera position such as to provide an appropriate viewpoint in dependence on, amongst other factors, whether or not interaction between the users virtual presence and the representation of another user is taking place.

In accordance with a first aspect of the present invention there is provided a multi-user interactive virtual environment system comprising: a first data store containing data defining a virtual environment; a second data store containing data defining the external appearance of a plurality of characters; and a processor coupled to receive input commands from a plurality of separate users and arranged to access the first and second stores and generate for each user a respective image of the virtual environment and characters therein, including an assigned character particular to that individual user, from a respective viewpoint at a position and orientation within the virtual environment determined at least partially by the user-directed motion of the users assigned character, characterised by: interaction zone generation means arranged to maintain updated coordinates for a respective zone of predetermined size and shape about the current virtual environment location for each character; and monitoring means coupled with the zone generation means and arranged to determine when the respective interaction zones of two or more user-assigned characters overlap and to signal the same to said processor, the determination of respective viewpoint location and orientation for each such user-assigned character being based at least partially on a predetermined set of rules applied by the processor for as long as the overlap remains.

By the provision of interaction zones (which will preferably be invisible to the user) a trigger mechanism is provided for switching the users virtual camera location. As will be described in examples hereinafter, the virtual camera may simply follow its character at a position effectively looking "over its shoulder" while there is no interaction (no zone overlap) and then swing around to a third-person view to give a more informative view of the two interacting representations.

As the power available to implement complex user virtual presences increases, the size and/or complexity of the virtual world they may be modelled in increases, as does the number of different users who may simultaneously visit the same part of the virtual world at any given time. The effect of this is that a large-scale overlapping of interaction zones in a small area may occur, leading to unacceptable processor loading as camera positions are calculated. To avoid this potential problem, the processor suitably maintains at least one further interaction zone at a fixed location within the virtual environment, with this fixed interaction zone or zones being independent of any particular character within the virtual environment. With these fixed zones being provided at popular and/or crowded locations within the virtual environment, with a particular set of rules governing camera positioning, a global camera view covering the area may be specified for all characters within the area to avoid individual camera position calculations. This feature may be pre-set for a particular location within the virtual environment (regardless of the number of characters/cursors in that location) or it may be applied dynamically at any location where it is determined that, for example, the interaction zones of five or more characters have overlapped.

By way of a refinement, these fixed interaction zones may be made up from a concentric arrangement of at least two partial zones with only a part of the set of rules being applied by the processor when a character interaction zone overlaps only the outer partial zone. In other words, the extent to which a characters respective camera movements are determined by the movements of the character diminishes as the inner partial zone (with global camera positioning) is approached.

BRIEF DESCRIPTION OF THE DRAWINGS

Further features and advantages of the present invention will become apparent from reading of the following description of preferred embodiments of the present invention, given by way of example only, and with reference to the accompanying drawings in which.

DESCRIPTION OF THE PREFERRED EMBODIMENTS

Figure 1:
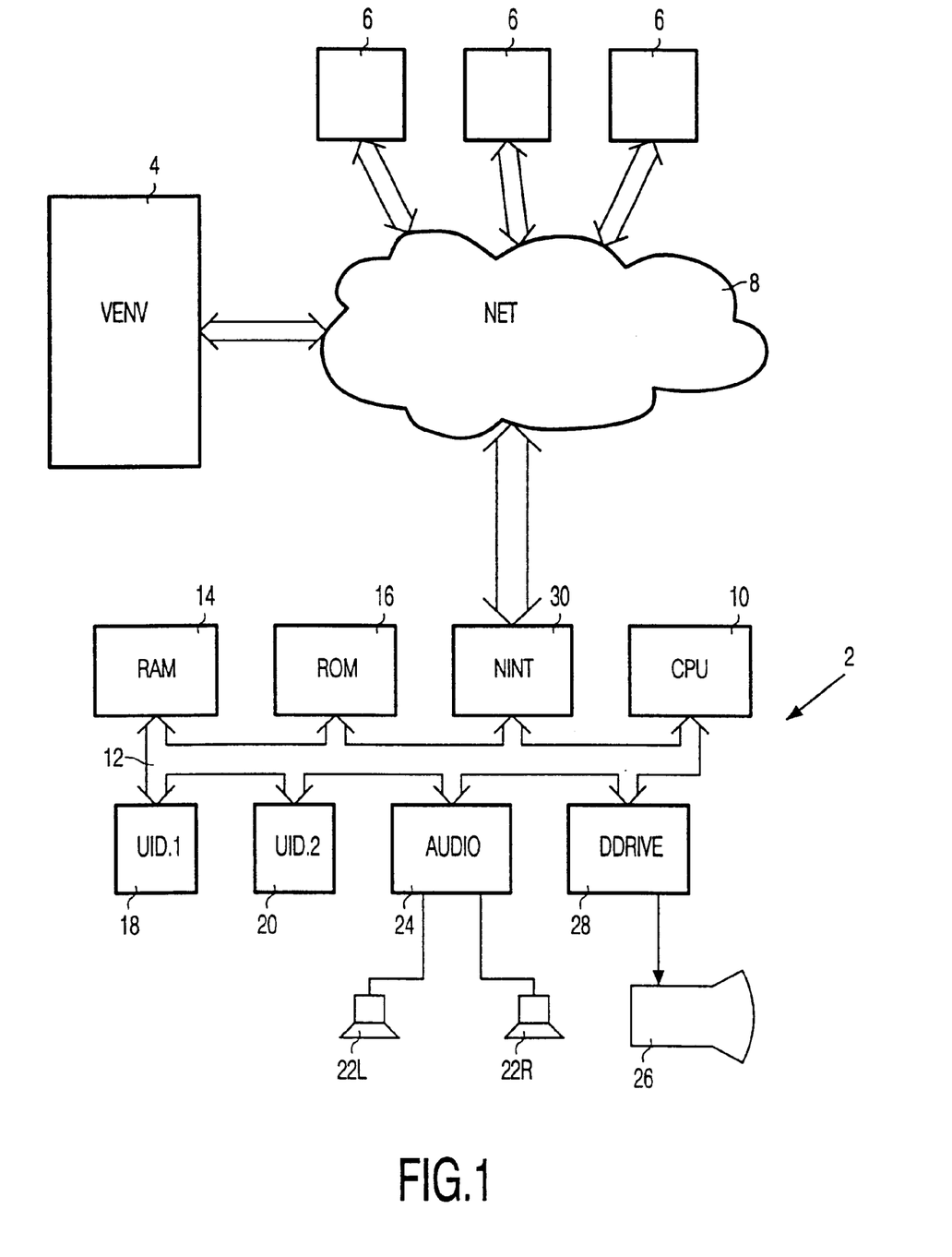
FIG. 1 is a block schematic diagram of a data processing apparatus suitable for configuration as a user terminal embodying aspects of the invention.

FIG. 1 shows a networked virtual environment system including a users data processing system 2, such as a personal computer, which acts as host for a software utility that configures it as a browser for data defining the virtual environment. The data is obtained from a remote source 4 via a network 8 connection, with other users 6 having similar data processing systems likewise connected to the source 4. The users system 2 comprises a central processing unit (CPU) 10 coupled via an address and data bus 12 to random-access (RAM) and read-only (ROM) memory devices 14, 16. The capacity of these memory devices may be augmented by providing the system with means to read from additional memory devices, such as a CD-ROM (not shown).

Also coupled to the CPU 10 via bus 12 are first and second user input devices 18, 20 which may suitably comprise a keyboard and a cursor control and selection device such as a mouse or trackball. Audio output from the system is via headphones or one or more speakers 22 driven by an audio processing stage 24; in addition to providing amplification, the audio processing stage is preferably also configured to provide a signal processing capability under the control of the CPU 10 to allow the addition of sound treatments such as echo to existing audio data. In dependence on the user-systems capabilities and the format of data supplied from source 4, video output from the system may be presented as a series of two-dimensional images on display screen 26 driven by display driver stage 28, or as a series of three-dimensional images on an autostereoscopic display or stereoscopic head-mounted display (not shown).

As mentioned, a further source of data for the system is via online link to remote sites for example via the Internet, including the server 4 acting as source of, and controller for, data defining the virtual environment. To this end, the system is provided with a network interface 30 coupled to the CPU 10 via bus 12. The precise construction of the interface is not an essential feature of the present invention, although it will be recognised that the interface configuration will depend on the type of data network 8 to which the system is to be coupled: for example, where the system is for use by a private home user, the data link is likely to be a telephone connection to a local service provider. In such a case, the interface 30 will suitably incorporate a modem. For other types of data link, such as an ISDN connection, the interface will be configured accordingly.

In operation, the users view of the virtual environment is generated by a virtual camera which camera, in the absence of other movement commands, assumes a position behind a computer-generated character or cursor 100 representing the users virtual presence, the position being slightly above or to one side of the representation (in effect looking over its "shoulder") to provide almost a first person viewpoint. In the following examples, the users computer-generated character, as well as those of other users within the same environment, is in the form of a star-shaped avatar which not only acts as a virtual presence for the user, but also provides cursor functions in that it provides the users means for interacting with not only other such cursors (of other users) but also with other features and objects as may be provided within the virtual environment. These avatars or characters will be referred to hereinafter as cursors.

Figure 2:
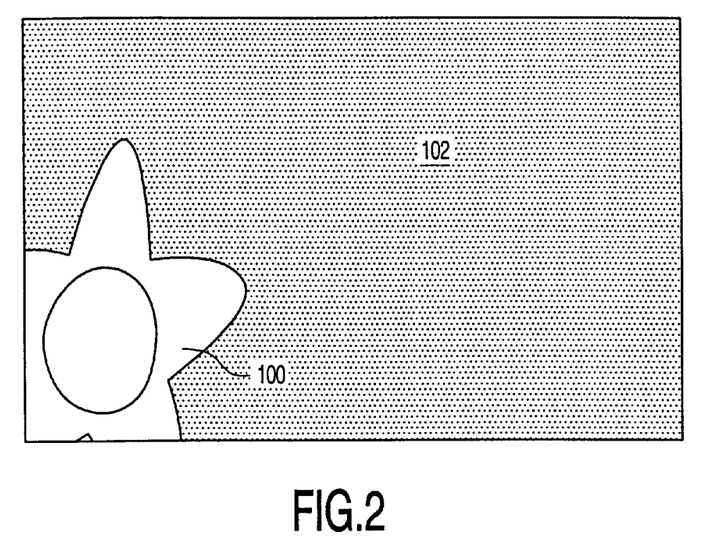
FIG. 2 represents a users view of the virtual environment over the shoulder of a star-shaped user representation or cursor.

As mentioned above and shown in FIG. 2, the basic camera viewpoint is over the "shoulder" of the cursor 100 such as to give the user a relatively uninterrupted view of the virtual environment 102, whilst retaining a minimal presence in vision to assist the users orientation. Camera positions, zooming and other effects such as lens selection are automatically determined by the movement, behaviour and profile disclosure usof the cursor (as will be described), such that the user has no direct control over the camera by UID (18, 20; FIG. 1) operation.

Figure 3:
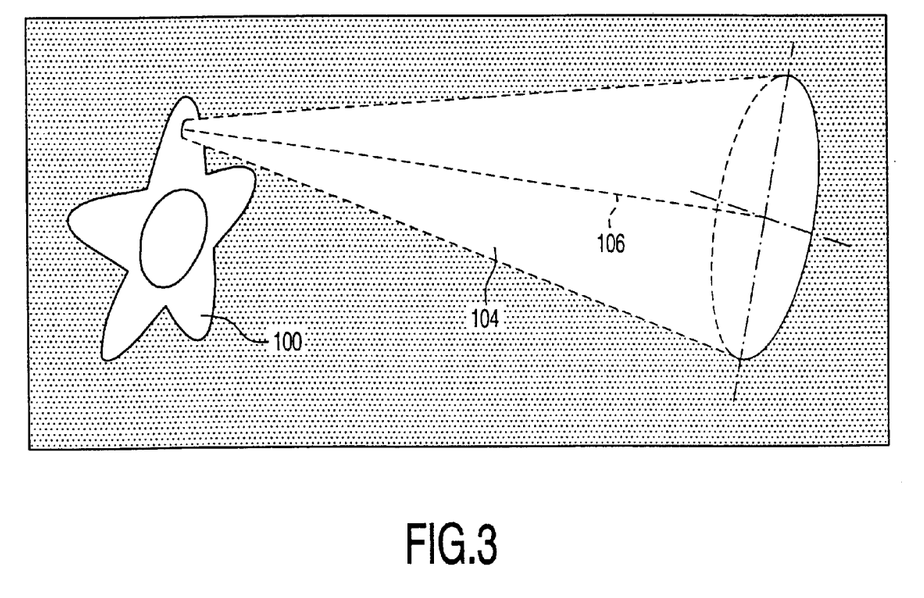
FIG. 3 shows a gaze-cone by which the directed attention of the cursor of FIG. 2 is highlighted.

As shown in FIG. 3, the cursor 100 has a "gaze cone" 104 by which it directs its attention: the gaze field is attached at an angle of 90° to the cursor, which is to say the major axis 106 of the gaze cone extends perpendicular to the generally planar cursor. In operation, the graphics renderer generating the environment image to the user notes the positioning of the gaze cone with respect to the environment and renders those environmental features appearing within the gaze cone with a greater level of detail (or focus) than those outside, to provide an intuitive focus of the cursors point of attention.

Figure 4:
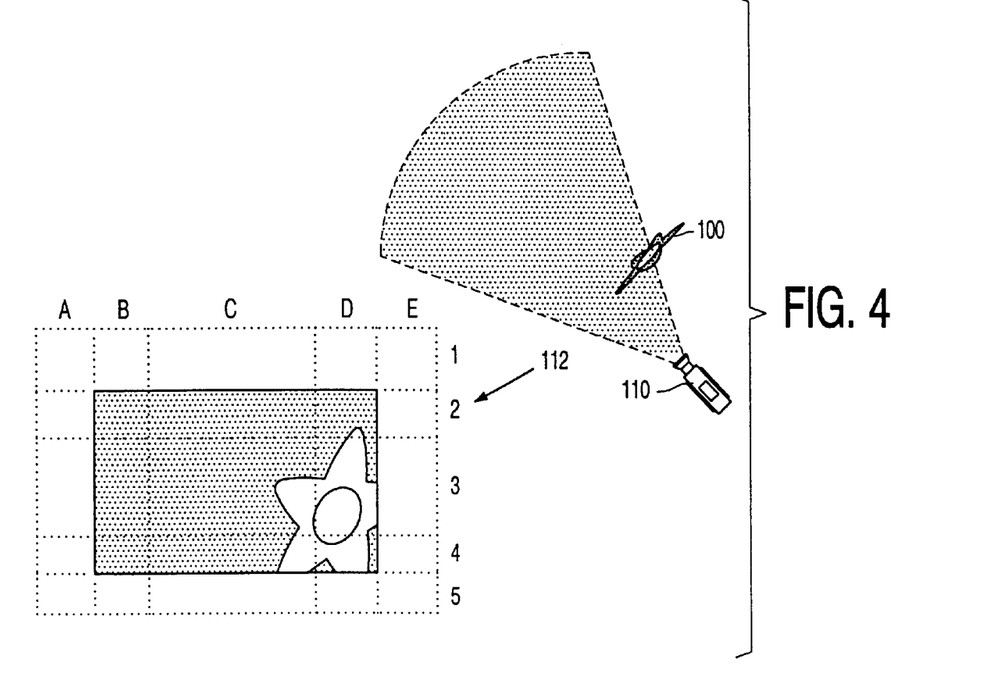
FIG. 4 shows one possible relative positioning of cursor and virtual camera and the division of the camera view into screen fields.
Figure 5A:
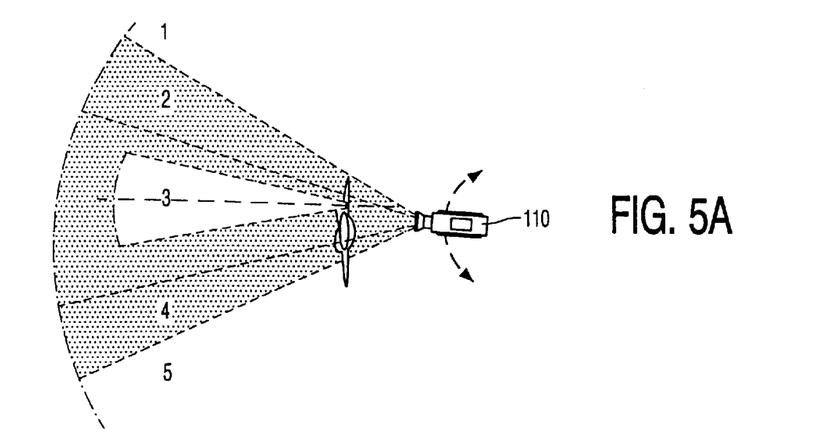
FIG. 5 illustrates the technique by which the virtual camera tracks rotational movements of the cursor.
Figure 5B:
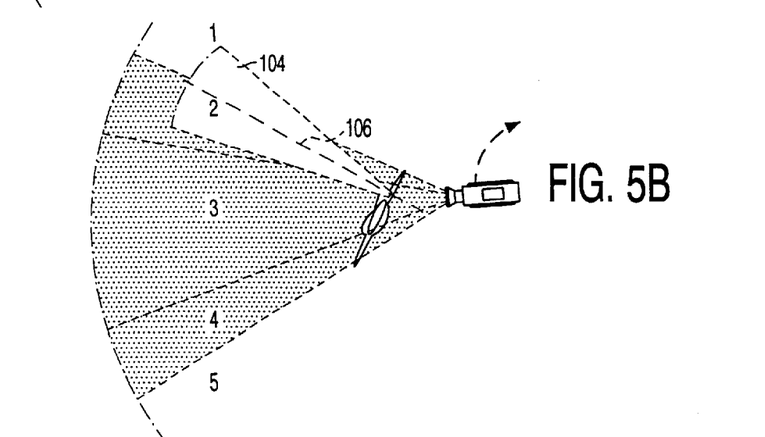
Figure 5C:
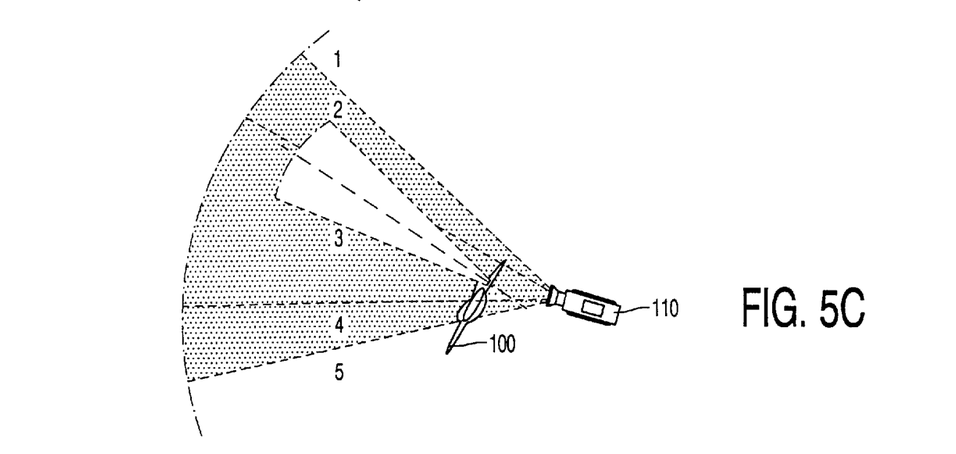

The view from the virtual camera (the view presented to the user on screen 26; FIG. 1) is divided into screen fields, which fields are not visible to the user, with the position of the gaze cone in the differing screen fields determining the automated repositioning of the camera (as will be described hereinafter). FIG. 4 is a plan view of the virtual camera 110 and cursor 100, with the inset view 112 showing the view from the virtual camera divided into different screen fields (A.1, B.1, ..., E.5). As the cursor direction of gaze travels upwards, downwards, left or right, the camera 110 moves with the gaze direction. In effect, if the cursor 100 continues to turn its gaze toward, for example, the left, both camera and cursor will eventually travel in a circle and come back to viewing the original segment of the virtual environment. FIG. 5 shows in three steps (A, B, C) how, as the gaze cone moves outside the central screen fields(2, 3, and 4 in this elevational view) through turning, the camera 110 repositions itself to bring the rendered viewpoint direction back to include that on which the cursor 100 is focusing, as indicated by the gaze cone major axis 106. This separation between camera and gaze cone allows small movements of the cursor, perhaps in response to uncertain operation of movement controls by the user, to be absorbed without resulting in corresponding jittery movements of the image from the virtual camera.

Figure 6A:
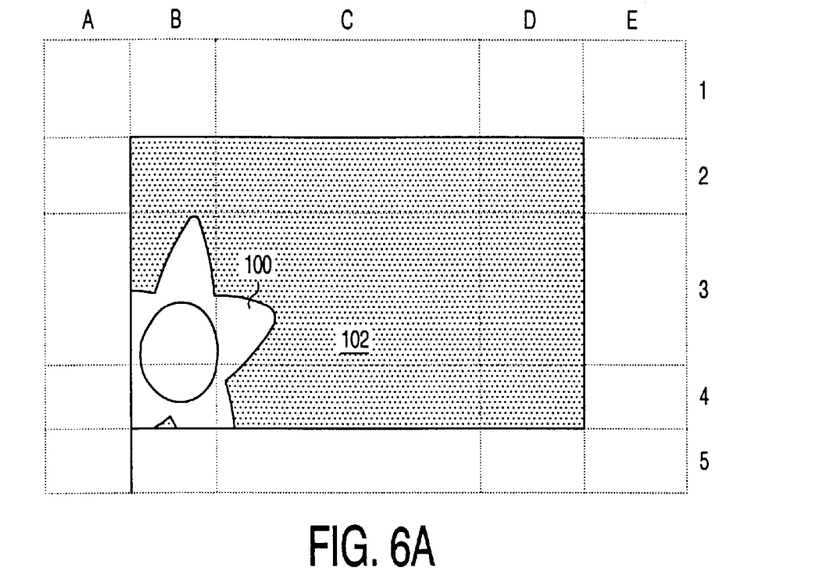
FIG. 6 illustrates differing on-screen display positions for a cursor at rest and a cursor in motion.
Figure 6B:
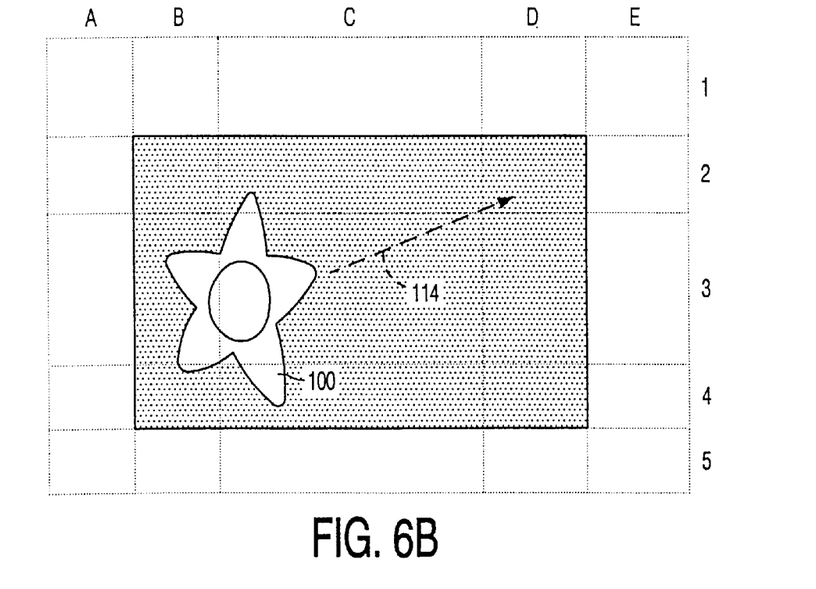

The over-the-shoulder framing of the cursor 100 as shown at A in FIG. 6 represents a stable position with the cursor at rest within the virtual environment. When the cursor 100 is moving, the cameras position changes automatically to give more of a third-person point of view, such as to provide the user with greater environmental context on which to base the navigational instructions. With the cursor at rest, its partially visible segment of cursor appears at the edge of the displayed image; whilst moving (in the direction indicated by arrow 114 in view B of FIG. 6), the higher the cursors speed, the closer it will appear to the centre of the image. Moving whilst turning the direction of the gaze cone will result in the third persons view of the cursor (i.e. cursor completely visible within the screen) with the representation of the cursor being angled as determined by the direction and extent of rotation.

Figure 7:
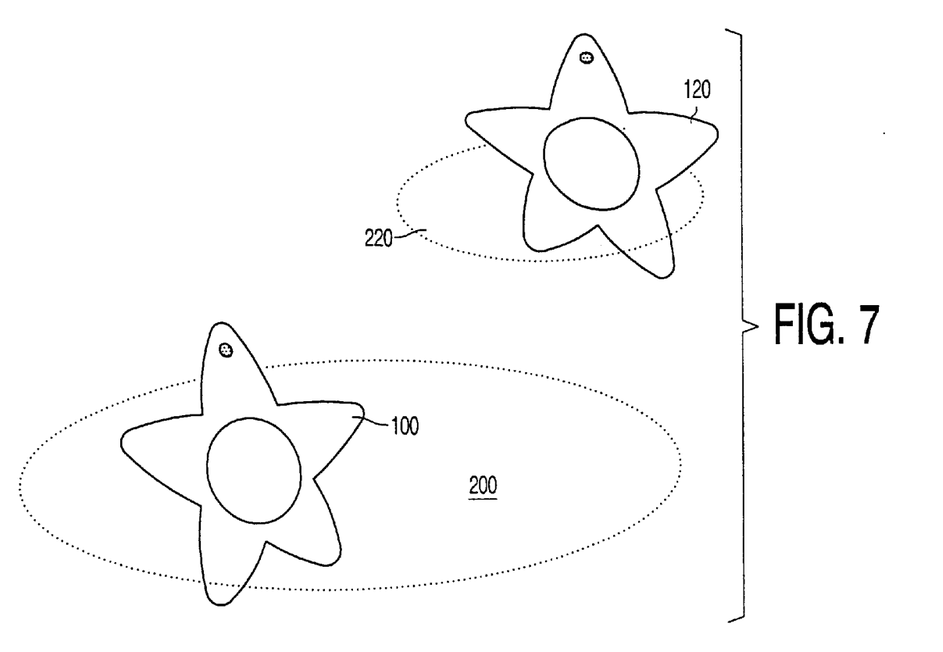
FIG. 7 shows a pair of cursors with respective interaction zones.
Figure 8:
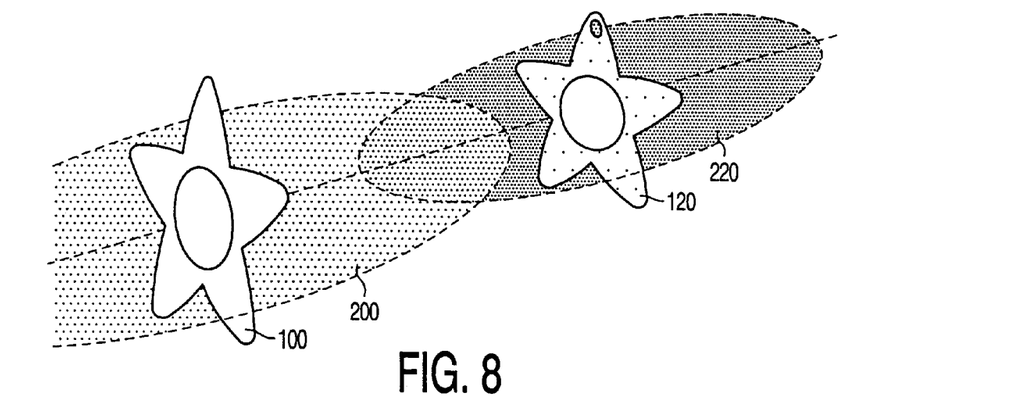
FIG. 8 represents the overlapping of the pair of interaction zones of FIG. 7.

Turning now to interaction between cursors of different users, as shown in FIG. 7, a cursor 100 has a circle of action or interaction zone 200, and in a multi-user environment, each cursor 100, 120, has a respective interaction zone 200, 220. In a three-dimensional virtual environment, the zone enclosing the cursor may be spherical or it may be stretched in one or more directions, for example being ovoid with the greater part of its volume positioned in front of the cursor generally aligning with the gaze cone major axis (106; FIG. 3). The size of the interaction zone 200 determines the extent to which a cursor 100 is likely and/or willing to interact with other cursors, since interaction can only occur between pairs or groups of cursors when the interaction zones merge or overlap as shown in FIG. 8. The merger or overlapping of two or more interaction zones also has an effect on camera control for each of the cursors whose zones are affected, as will be described below.

A user can arrange or influence personal elements in his/her user profile disclosure (a data structure carrying information in nested form with differing access requirements). The amount and kind of information in the profile disclosure could, in a preferred embodiment, determine the size of the interaction zone. For example, a cursor holding a large amount of information in the outer (public) layers of its profile disclosure may be assumed to be willing to interact and hence would have a large interaction zone.

Figure 9:
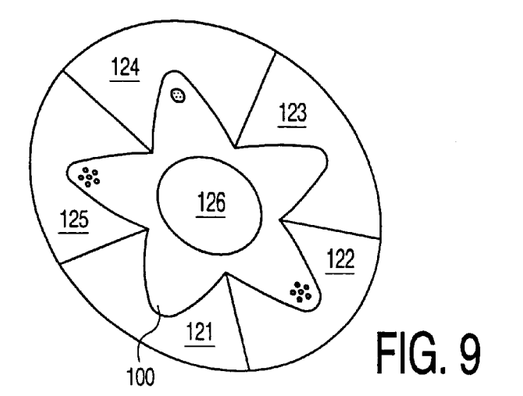
FIG. 9 shows the nominal division of a cursor exterior into a number of discrete zones.

Information in the user profile disclosure of a cursor may be accessed by other cursors: by scanning the exterior of another cursor with its gaze cone (which gaze is detected by the scanned cursor) that cursors user profile information becomes visible. The exterior of the cursor is divided into a number of zones 121–125 for which data from the public layers of the profile disclosure (such as basic user details and preferences) is distributed in a predetermined arrangement, together with a central zone 126 carrying more personal and private data of the cursors user, as shown in FIG. 9. Some of these zones (especially the outer ones 121–125) are more "sensitive", i.e. ready to give up their contents, than others in response to scanning by another cursor: for example, the personal data in the central zone 126 may not be given up automatically, but instead may require explicit unlocking and/or sending by the user whose cursor it is. The sensitivity of the zones determines the extent of zoom applied by the camera tracking the scanning cursor, for example if the information in a scanned zone corresponds to that either held or sought by the scanning cursor, the identification of the match will cause the camera tracking the scanning cursor to zoom in on the source of the matched information. An alternative way for zooming to be controlled is by a potentially scanned cursor moving a particular one of its zones toward a potentially scanning cursor, with the approach of a zone triggering a cursor camera to zoom in.

Figure 10:
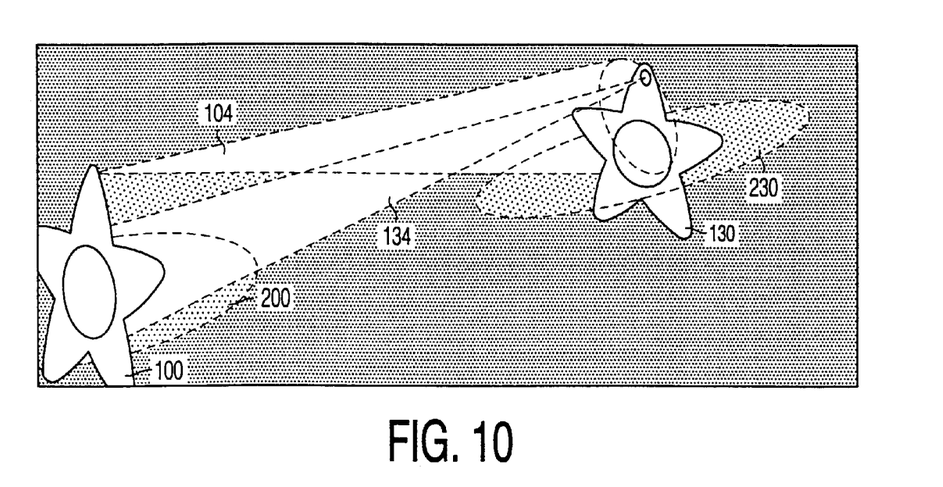
FIGS. 10 and 11 represent a pair of cursors initiating interaction through gaze cones.
Figure 11:
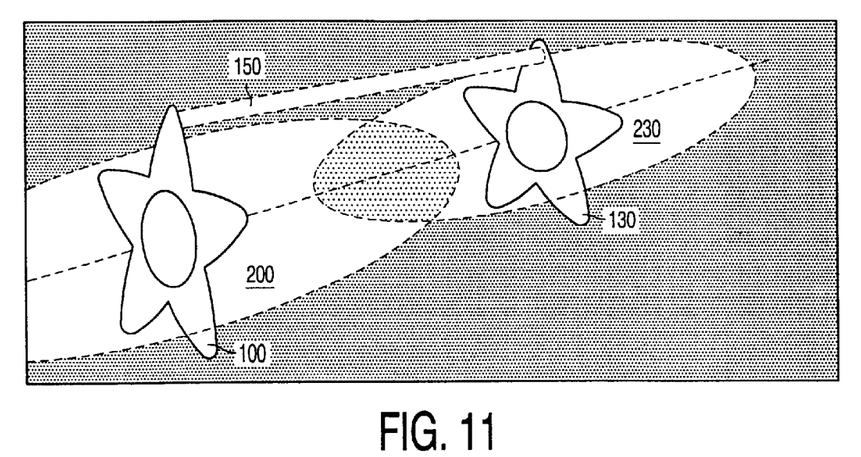
Figure 12:
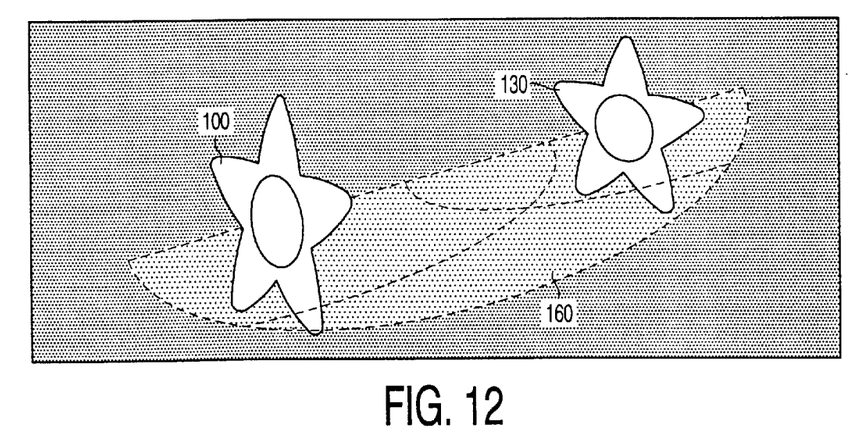
FIGS. 12 to 15 illustrate virtual camera movements for two- and three-cursor interactions.

In the absence of overlapping interaction zones, the gaze cone still enables cursors to interact. A one-way communications channel is opened as two cursors direct the gaze cones at each other. The one-way communications channel allows cursors to send pieces of data from their public user profile disclosure, which data may be sound segments, images and so forth. FIG. 10 shows a pair of cursors 100, 130 with their respective gaze cones 104, 134 on the other cursor but their interaction zones 200, 230 separate, such that only the one-way channel exists between them. As the two cursors come closer to one another, their interaction zones overlap as shown in FIG. 11, triggering the conversion from a one-way to a two-way communications link 150 between the two cursors 100, 130 in which a scanning cursor may obtain data from deeper profile layers of the scanned cursor rather than just the external public layer.

The mechanics of the overlapping interaction zones are further illustrated in FIGS. 12 to 15. The camera positions that frame the users view of the encounter are defined by the merged interaction zones. Any camera position to show both cursors lies within a half of the area 160 shown in FIG. 12 and defined by the merged interaction zones, which area is known from cinematography as the 180° space. The camera positions from which either cursor 100, 130 is rendered are defined by this 180° space, the strict application of which avoids disorienting effects that may otherwise arise when the viewpoint switches from one side of a cursor to another.

Figure 13:
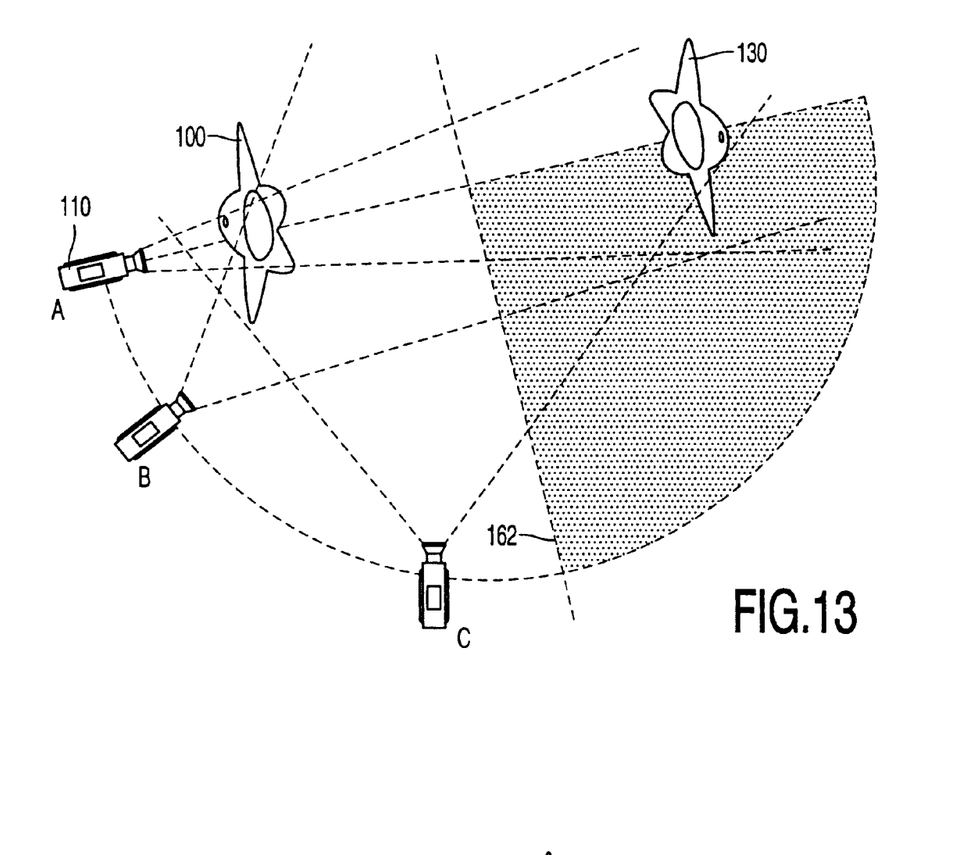

Having defined the 180° space 160 from the merged interaction zones, the space is then divided into two quarters (either side of line 162), with the virtual camera from each cursor only able to take up a position within its respective quarter. Each cursor has its own camera curve within the quarter that is allocated to the positioning of its camera. FIG. 13 presents an overview of the camera 110 positions for the cursor 100 to the left of the Figure. The camera can move fluently on the curve at the border of the quarter. Across the curve, the camera may move from a third person point of view at C, via an offset over-the-shoulder point of view at B, to a first person point of view at A: note that in the first person point of view, the users view of their own cursor may in certain embodiments be faded out of the rendered image avoid obscuring the view of the cursor being interacted with.

Figure 14:
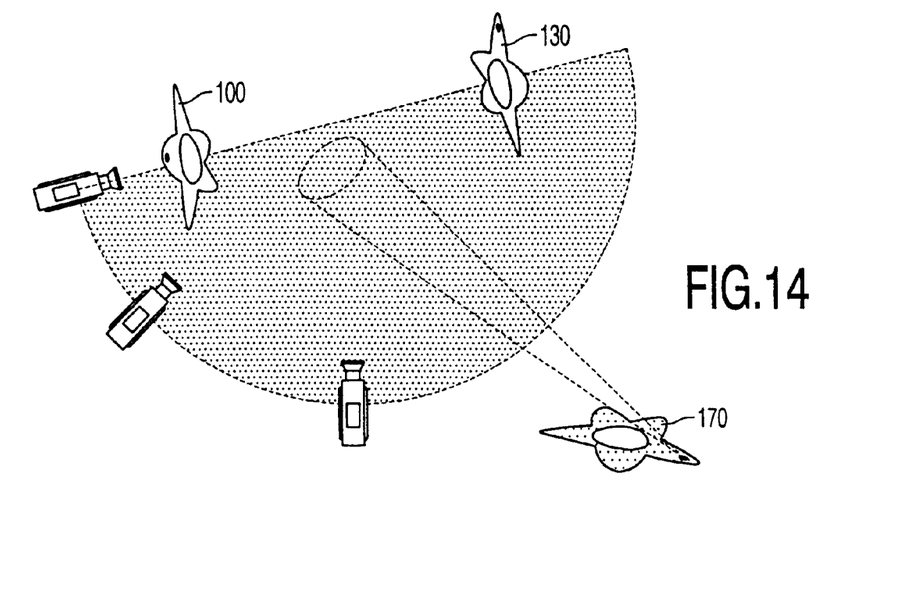
Figure 15:
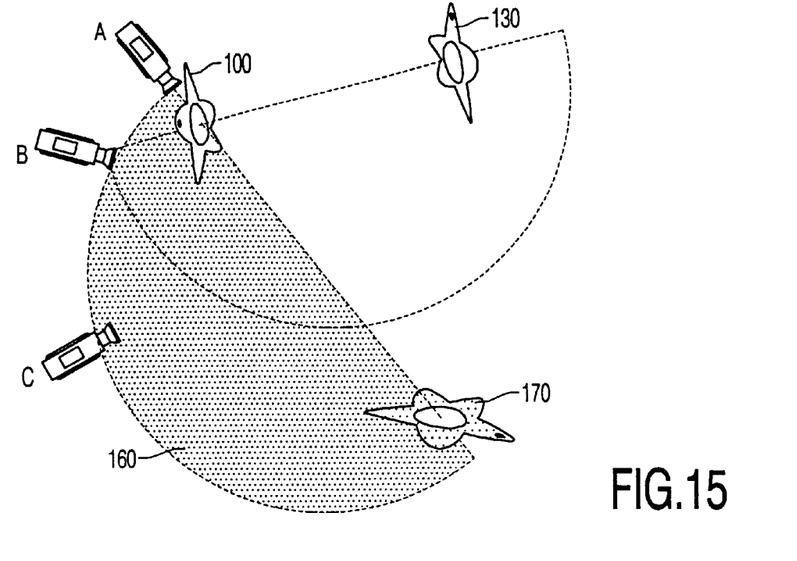

When two cursors 100, 130 meet, their camera curves will be opposed to one another, as described above. As shown in FIG. 14, a third cursor 170 outside of the 180° space will initially be passive, with no effect on the other two cursors. However, as shown in FIG. 15, as the third cursor 170 interacts with one of the first 100 or second 130 cursors, the 180° space 160 shifts to encompass the interacting pair 100, 170 from the three cursors, reverting to its original position as the original pair of cursors 100, 130 (assuming neither has moved in the interim) resume their interaction.

In addition to simple encounters with other users (or optionally with other features of the virtual environment), exchanging material from the user profile disclosures, or the more personal material which is contained within the "soft" part of the cursor body (central zone 126; FIG. 9) may also result in shifting camera position. If a large amount of information is being transferred between two cursors, their respective camera positions might be controlled to gradually or rapidly move from first person or over-the-shoulder views to third person views. Passivity of one cursor may also cause a change in camera view: if a two-way communications link exists between a pair of cursors, but only one is active in sending data and/or making data available for reading, the camera tracking the passive cursor might suitably be set to zoom in on the active cursor.

Figure 16:
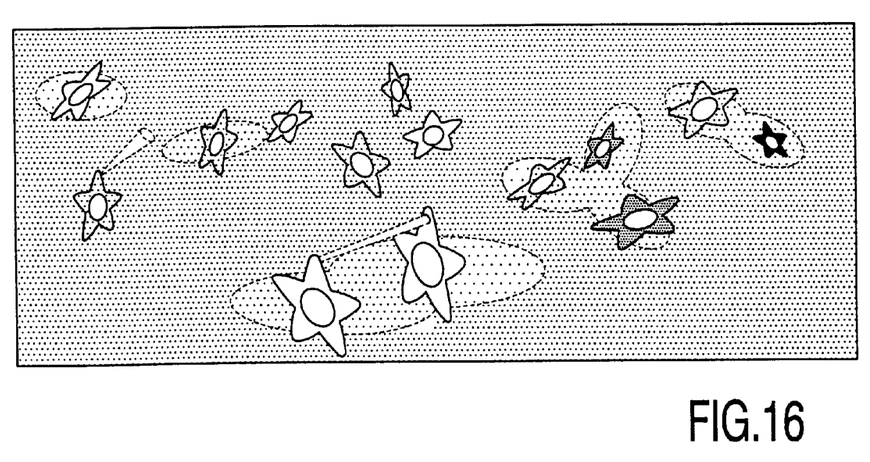
FIG. 16 represents a plurality of cursors within a virtual environment interacting in discrete groups of two or three.

If there are many cursors within a virtual environment, their respective camera positions will generally be controlled as described above, with reference to whether there are overlapping interaction zones and/or directed gaze cones. However, in practical terms, there is a limit on the number of simultaneously interacting cursors defined by the processing and speed power available to the system. For example, there may be a limit of five simultaneous overlapping interaction zones before the necessary calculations for the merging of the zones slow the system to the point where its becomes burdensome to the user: however, within a single environment, several groups of merged cursor pairs and triplets may be accommodated, as shown in FIG. 16.

Figure 17:
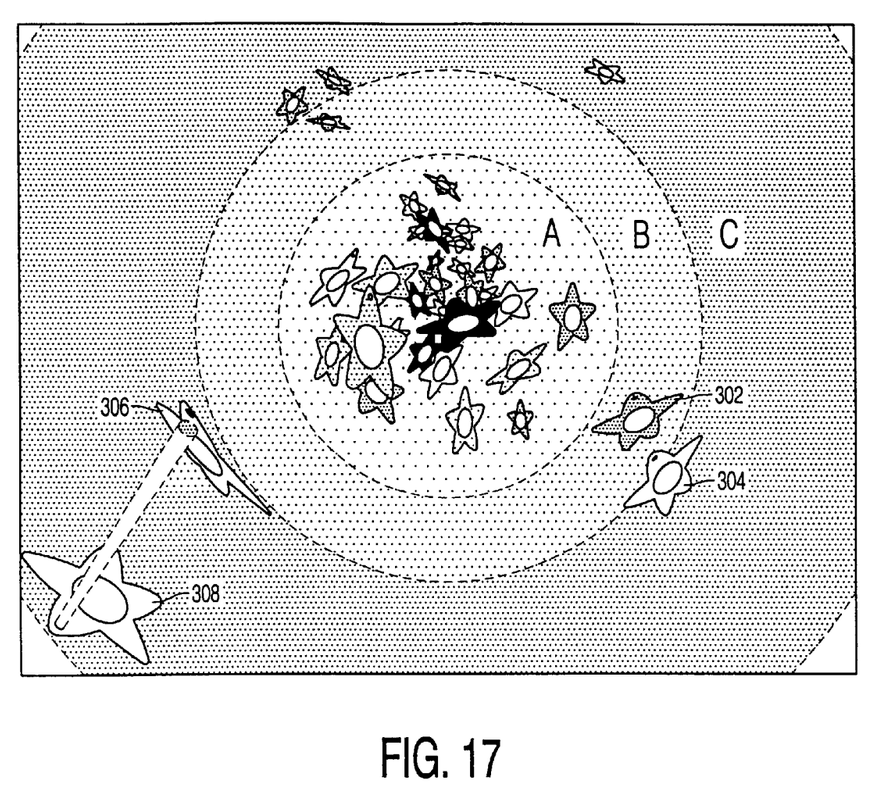
FIG. 17 shows a fixed interaction zone catering for larger clusters of interacting cursors.

In the collection of virtual environments available to users, certain environments will be likely to attract large numbers of users (via their cursors) and some form of moderation is required if such areas are not to become "jammed" through too many cursors attempting to interact at once. This is achieved by providing such areas with their own protocol governing camera control: in effect, the area is a fixed interaction zone not attached to a cursor. Camera choreography, cuts, dissolves, rhythms, colour and strobing effects can be assigned automatically depending on which part of the area the cursor is in. FIG. 17 shows such a space where there are concentric zones A, B, C determining the level of individual camera control assigned to a cursor in each, ranging from full control as described previously for two or three cursor interactions in the outside zone C through to no individual control with viewpoint generation being handled for all included cursors by a single area mechanism in the inner zone A. The only control option for the user is whether to remain at the heart of the area or to leave.

In terms of the display and exchange of user profile information in the inner zone A, the protocol suitably causes all cursors to "leak" some information from their public layers (the outer, more accessible layers of their internal data storage structure), which leaked information may be picked up by other cursors in the area if it is of interest to them. Once a piece of information has been picked up, the cursor that leaked it is notified and the two cursors 302, 304 move to a first boundary area B where interaction with over-the-shoulder viewpoint rendering is supported, such as to give a certain degree of privacy to the exchange between the two cursors. Based on this exchange, if it is decided that the two cursors wish to exchange more private details, they move out to the area C beyond zone B where there are no area-based restrictions on camera control or interaction zone merging, as shown by cursors 306 and 308.

Although the foregoing examples have concentrated on the automation of the virtual camera positioning, it will be readily appreciated by the skilled practitioner that many of the foregoing techniques may be applied in the handling of audio for the virtual environment, with the virtual camera location and orientation being replaced by a virtual microphone or pair of stereo microphones, such as to generate a two- or three-dimensional sound scape for supply via the system audio stage (24; FIG. 1).

In addition to sounds resulting directly from the users interaction (through the cursor) with other users or features of the virtual environment, there may also be background noise from directed sources such as to provide the user with further navigational cues or context information. For example approaching an area of the virtual environment from which high volume background noise is emanating provides the user with a cue that the location may contain the cursors of a large number of other users interacting. Depending on recognisable components picked up from the background noise, the user may also be able to determine the type or purpose of this section of the environment and perhaps avoid it if not to his/her taste. With at least stereoscopic audio handling from the cursor point of view (within the virtual environment, the individual sources should be mono and change in volume in dependence on their distance from a cursor), the user may be enabled to navigate through the virtual environment to reach an area that can be heard but not initially seen.

Although claims have been formulated in this application to particular combinations of features, it should be understood that the scope of the disclosure of the present application also includes any novel feature or combination of features disclosed herein either explicitly or implicitly, whether or not relating to the same invention as presently claimed in any claim and whether or not it mitigates any or all of the same technical problems as does the presently claimed invention. The applicants hereby give notice that new claims may be formulated to such features and/or combinations of such features during prosecution of the present application or of any further application derived therefrom.

What is claimed is:

1. A multi-user interactive virtual enviromnent system comprising:

a first data store containing data defining a virtual environment;

a second data store containing data defining the external appearance of a plurality of characters; and one or more processors configured to:
receive input commands from a plurality of users,
access the first and second stores,
generate for each user a respective image of the virtual environment and characters therein, including an assigned character particular to that individual user, from a respective viewpoint at a position and orientation within the virtual environment determined at least partially by the user-directed motion of the users assigned character;
provide updated coordinates for a respective interaction zone of predetermined size and shape about the current virtual environment location for each character; and
determine when the respective interaction zones of two or more user-assigned characters overlap;

wherein
the determination of respective viewpoint location and orientation for each such user-assigned character is based at least partially on a predetermined set of rules applied by the processor for as long as the overlap remains.

2. A system as claimed in claim 1, wherein
the processor maintains at least one further interaction zone at a fixed location within the virtual environment,
the at least one further interaction zone being independent of any particular character within the virtual environment.

3. A system as claimed in claim 2, wherein the at least one further interaction zone comprises a concentric arrangement of at least two partial zones with only a part of the set of rules being applied by the processor when a character interaction zone overlaps only the outer partial zone.

4. A system as claimed in claim 1, wherein
the processor applies at least one further interaction zone at a selected location within the virtual enviromnent,
the at least one further interaction zone being independent of any particular character within the virtual environment but located at a position where it is determined that a number of character-assigned interaction zones overlap.

5. A system as claimed in claim 4, wherein
the processor applies the at least one further interaction zone at a position where it is determined that five or more character-assigned interaction zones overlap.

6. The system as claimed in claim 1, wherein
the predetermined size and shape about the current virtual enviromnent location for each character is based on a preference of the corresponding user.

7. The system as claimed in claim 1, wherein
the processor is further configured to effect a communication between corresponding users when the respective interaction zones of the two or more user-assigned characters overlap.

8. The system as claimed in claim 7, wherein
the communication between the corresponding users is dependent upon an amount of the overlap.

9. The system as claimed in claim 7, wherein
the interaction zone of each user comprises regions, and
the communication between the corresponding users is dependent upon the regions of the respective interaction zones that overlap.

10. The system as claimed in claim 1, wherein
the interaction zone of each user comprises regions, and
the predetermined set of rules is dependent upon the regions of the respective interaction zones that overlap.

11. A computer program for operation on a processing system, which is configured to:
determine a location and orientation of each of a plurality of characters,
the location and orientation of at least one character of the plurality of characters being determined based on user-directed motions of the at least one character by a corresponding user;
determine an interaction zone associated with each of the plurality of characters;
the interaction zone being based on:
the location and orientation of the corresponding character, and
an interaction region of predetermined size and shape associated with the corresponding character;
determine overlaps of the interaction regions of the plurality of characters; and
effect actions among the plurality of characters based on the overlaps.

12. The computer program of claim 11, further configured to
effect actions among the plurality of characters based on the locations of the plurality of users relative to a common interaction zone.

13. The computer program of claim 12, wherein
the common interaction zone has a location that is independent of the locations of the plurality of users.

14. The computer program of claim 11, wherein
the predetermined size and shape of the interaction zone for the at least one character is based on a preference of the corresponding user.

15. The computer program of claim 11, further configured to effect communications between users based on the overlaps.

16. The computer program of claim 15, wherein
the communication between the users is dependent upon an amount of the determined overlap between the users.

17. The computer program of claim 15, wherein
the interaction region of each character includes sub-regions, and
the communication between the users is dependent upon the sub-regions of the respective interaction zones that overlap.

18. The computer program of claim 11, wherein
the interaction region of each user comprises sub-regions, and
the actions that are effected are dependent upon the sub-regions of the respective interaction zones that overlap.

19. A method for effecting actions in a multi-character event, comprising:
determining a location and orientation of each of a plurality of characters,
the location and orientation of at least one character of the plurality of characters being determined based on user-directed motions of the at least one character by a corresponding user;
determining an interaction zone associated with each of the plurality of characters;
the interaction zone being based on:
the location and orientation of the corresponding character, and
an interaction region of predetermined size and shape associated with the corresponding character; and
determining overlaps of the interaction regions of the plurality of characters;
effecting the actions based on the overlaps.

20. The method of claim 19, wherein
the predetermined size and shape of the interaction zone for the at least one character is based on a preference of the corresponding user.

* * * * *